US010973006B2

(12) United States Patent
Feng

(10) Patent No.: US 10,973,006 B2
(45) Date of Patent: Apr. 6, 2021

(54) METHOD, MOBILE STATION, AND NETWORK APPARATUS FOR TRANSMITTING SERVICE

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 336 days.

(21) Appl. No.: 15/774,887

(22) PCT Filed: Feb. 5, 2016

(86) PCT No.: PCT/CN2016/073676
§ 371 (c)(1),
(2) Date: May 9, 2018

(87) PCT Pub. No.: WO2017/132998
PCT Pub. Date: Aug. 10, 2017

(65) Prior Publication Data
US 2020/0267709 A1 Aug. 20, 2020

(51) Int. Cl.
*H04W 72/04* (2009.01)
*H04L 1/18* (2006.01)

(52) U.S. Cl.
CPC ....... *H04W 72/0406* (2013.01); *H04L 1/1812* (2013.01)

(58) Field of Classification Search
CPC .. H04W 72/04; H04W 72/0406; H04L 1/1812
See application file for complete search history.

(56) References Cited

U.S. PATENT DOCUMENTS 8,385,241 B2  2/2013  Yu
8,432,845 B2  4/2013  Yu
(Continued)

FOREIGN PATENT DOCUMENTS

CN  101198185 A  6/2008
CN  101547514 A  9/2009
(Continued)

OTHER PUBLICATIONS

Supplementary European Search Report in the European application No. 16888823.8, dated Jun. 26, 2019.
(Continued)

*Primary Examiner* — Chi Ho A Lee
*Assistant Examiner* — Andrew Lee
(74) *Attorney, Agent, or Firm* — Ladas & Parry LLP

(57) ABSTRACT

Disclosed in the present invention are a method, mobile station, and network apparatus for transmitting a service. The mobile station employs, by means of SPS, a first resource allocation parameter set to transmit a current service. When a requirement of the service changes, the network apparatus instructs, via a control signaling, the mobile station to replace the first resource allocation parameter set with a second resource allocation parameter set, and employ the second resource allocation parameter set to transmit the service having the changed requirement, or to employ a second resource allocation parameter set along with the first resource allocation parameter set to transmit the service having the changed requirement. The method, mobile station and network apparatus for transmitting a service in the embodiments of the present invention save signaling costs by completing SPS re-configuration with less control signaling.

14 Claims, 13 Drawing Sheets

(56) References Cited

U.S. PATENT DOCUMENTS

| | | | |
|---|---|---|---|
| 8,526,378 B2 | 9/2013 | Kim | |
| 8,879,454 B2 | 11/2014 | Yu et al. | |
| 2004/0259562 A1* | 12/2004 | Madour | H04W 28/18 455/452.2 |
| 2008/0130590 A1 | 6/2008 | Kim | |
| 2009/0268693 A1 | 10/2009 | Lindh | |
| 2010/0150091 A1 | 6/2010 | Yu | |
| 2011/0188463 A1 | 8/2011 | Kim | |
| 2011/0250918 A1* | 10/2011 | Jen | H04W 52/08 455/509 |
| 2012/0014344 A1 | 1/2012 | Yu | |
| 2012/0155416 A1 | 6/2012 | Zhang | |
| 2012/0213196 A1* | 8/2012 | Chung | H04W 74/08 370/330 |
| 2012/0314680 A1* | 12/2012 | Kela | H04W 72/042 370/329 |
| 2013/0083702 A1 | 4/2013 | Barany et al. | |
| 2013/0163494 A1 | 6/2013 | Yu et al. | |
| 2013/0294247 A1 | 11/2013 | Zhu | |
| 2014/0086112 A1* | 3/2014 | Stern-Berkowitz | H04L 1/1822 370/280 |
| 2014/0362832 A1* | 12/2014 | Rudolf | H04L 1/1822 370/336 |
| 2015/0282148 A1* | 10/2015 | Le | H04W 72/0406 370/329 |
| 2015/0351039 A1* | 12/2015 | Yang | H04W 48/18 370/328 |
| 2016/0219475 A1* | 7/2016 | Kim | H04W 76/27 |
| 2017/0013565 A1* | 1/2017 | Pelletier | H04W 52/343 |
| 2017/0041828 A1* | 2/2017 | Zhang | H04L 67/22 |
| 2018/0295642 A1* | 10/2018 | Miao | H04W 72/1289 |

FOREIGN PATENT DOCUMENTS

| | | | |
|---|---|---|---|
| CN | 101730253 A | 6/2010 | |
| CN | 101765211 A | 6/2010 | |
| CN | 101998643 A | 3/2011 | |
| CN | 102014508 A | 4/2011 | |
| CN | 102137497 A | 7/2011 | |
| CN | 102246566 A | 11/2011 | |
| CN | 102325380 A | 1/2012 | |
| CN | 103139909 A | 6/2013 | |
| CN | 104394597 A | 3/2015 | |
| EP | 2475208 A1 | 7/2012 | |
| EP | 2866366 A1 | 4/2015 | |
| JP | 2013504226 A | 2/2013 | |
| JP | 2014528674 A | 10/2014 | |
| WO | 2013023684 A1 | 2/2013 | |
| WO | 2014208924 A1 | 12/2014 | |
| WO | 2013038525 A1 | 3/2015 | |

OTHER PUBLICATIONS

English translation of the Written Opinion of the International Search Authority in the international application No. PCT/CN2016/073676, dated Nov. 2, 2016.

First Office Action of the Japan application No. 2018-527937, dated Aug. 27, 2019.

International Search Report in international application No. PCT/CN2016/073676, dated Nov. 2, 2016.

Written Opinion of the International Search Authority in international application No. PCT/CN2016/073676, dated Nov. 2, 2016.

LG Electronics Inc., "Email discussion—[91bis#36][LTE/V2X] Latency analysis", 3GPP TSG-RAN WG2 #92 draft R2-156505 Anaheim, CA, USA, Nov. 16-20, 2015.

First Office Action of the Indonesian application No. P00201804014, dated Feb. 21, 2020.

First Office Action of the Chinese application No. 201680057617.4, dated May 6, 2020.

First Office Action of the Indian application No. 201817018372, dated Jul. 16, 2020.

First Office Action of the Taiwanese application No. 106103193, dated Sep. 8, 2020.

European Search Report in the European application No. 20199043.9, dated Oct. 13, 2020.

First Office Action of the Japanese application No. 2020-025084, dated Jan. 12, 2021.

* cited by examiner

800

```
┌─────────────────────────────────────────┐
│ A MS transmits a present service by     │
│ means of a first resource allocation    │ ~ S810
│ parameter set in a semi-static          │
│ scheduling manner                       │
└─────────────────────────────────────────┘
                    │
┌─────────────────────────────────────────┐
│ The MS receives first control signaling │
│ sent by network equipment, the first    │
│ control signaling being configured to   │
│ indicate the MS to transmit a service   │
│ with a changed requirement by means of  │
│ a second resource allocation parameter  │ ~ S820
│ set instead of the first resource       │
│ allocation parameter set or transmit    │
│ the service with the changed            │
│ requirement by means of the second      │
│ resource allocation parameter set and   │
│ the first resource allocation parameter │
│ set in the semi-static scheduling manner│
└─────────────────────────────────────────┘
                    │
┌─────────────────────────────────────────┐
│ The MS transmits the service with the   │
│ changed requirement according to the    │
│ first control signaling, wherein each   │
│ of the first resource allocation        │ ~ S830
│ parameter set and the second resource   │
│ allocation parameter set includes at    │
│ least one resource allocation parameter │
└─────────────────────────────────────────┘
```

FIG. 8

METHOD, MOBILE STATION, AND NETWORK APPARATUS FOR TRANSMITTING SERVICE

RELATED APPLICATION

This application is an application under 35 U.S.C. 371 of International Application No. PCT/CN2016/073676 filed on Feb. 5, 2016, the entire contents of which are incorporated herein by reference.

TECHNICAL FIELD

The disclosure relates to communications, and more particularly to a method for transmitting a service, a mobile station (MS) and network equipment.

BACKGROUND

In one aspect, an application field of a cellular network system in the future will be extended from conventional human-to-human communication to human-to-thing communication and thing-to-thing communication. Researches on the aspects of a Machine Type Communication (MTC) service, a Vehicle to X (V2X) service or the like have been started in an existing Long Term Evolution (LTE) system. The MTC service may also be called as an Internet of things service.

For a 5th-Generation (5G) system in the future, there may correspondingly exist the following typical service scenarios: a high-throughput, high-capacity and high-spectrum-efficiency Mobile Broadband (MBB) service, for example, a Voice over Long Term Evolution (VoLTE) service; a low-power-consumption massive MTC service; and a low-latency and ultra-reliable MTC service, for example, a V2X service. In these scenarios, periodic service transmission will become a typical service transmission.

In the other aspect, along with development of a communication technology, an LTE system has been able to provide multiple scheduling manners, for example, dynamic scheduling, persistent scheduling and semi-static scheduling.

Herein, the semi-static scheduling may also be called as semi-persistent scheduling, that is, allocating resources to users according to a certain period, so that resource allocation in the period is not required to be indicated by scheduling signaling. Compared with dynamic scheduling, such a scheduling manner is relatively poorer in flexibility but relatively lower in control signaling overhead and suitable for a service with an unobvious burst characteristic and a guaranteed rate requirement, for example, the VoLTE service and V2X service mentioned above. Dependent on requirements, different services or different service types are usually required to be configured with different semi-static scheduling resources.

In a related art, a user usually transmits a service of only one service type within a period of time. For the service type transmitted by the user, network-side equipment allocates a semi-static scheduling resource to it through a Physical Downlink Control Channel (PDCCH). When service transmission is completed, the network-side equipment releases the semi-static scheduling resource through the PDCCH. When the user transmits a service of a new service type, the network-side equipment sends the PDCCH again to allocate a new semi-static scheduling resource. In addition, when a receiving period or sending period of a certain service is changed according to a requirement or a size of a data packet during service transmission is changed, semi-static scheduling resource releasing and reallocation processes are also required to be experienced according to the abovementioned flows. Such processes may cause occupation of a large number of PDCCH resources.

In addition, under some special conditions of the related art, a user may also transmit a service of another service type, besides a service which is transmitted at present. Under such a condition, network-side equipment usually temporarily indicates a semi-static scheduling resource configuration of a current subframe in a dynamic scheduling manner through a PDCCH. Since the new service is still periodically constant, a semi-static scheduling resource configuration of a next subframe is also required to be indicated in the dynamic scheduling manner through the PDCCH according to requirement(s). Such a manner may immediately solve a semi-static scheduling resource configuration problem. However, semi-static scheduling resource configuration is performed on each subframe, which may also cause occupation of a large number of PDCCH resources.

SUMMARY

Embodiments of the disclosure provide a method for transmitting a service, an MS and network equipment, which may complete semi-static scheduling reconfiguration and may reduce a signaling overhead.

A first aspect provides a method for transmitting a service. An MS transmits a present service by means of a first resource allocation parameter set in a semi-static scheduling manner. The MS receives first control signaling sent by network equipment, the first control signaling being configured to indicate the MS to transmit a service with different requirement(s) by means of a second resource allocation parameter set instead of the first resource allocation parameter set or transmit the service with the different requirement(s) by means of the second resource allocation parameter set and the first resource allocation parameter set in the semi-static scheduling manner. The MS transmits the service with the different requirement(s) according to the first control signaling. Herein, each of the first resource allocation parameter set and the second resource allocation parameter set may include at least one resource allocation parameter.

It should be understood that each of the first resource allocation parameter set and the second resource allocation parameter set is a resource allocation parameter set allocated to the MS by the network equipment and configured for semi-static scheduling.

It should be understood that transmission of the disclosure includes uplink transmission and downlink transmission, namely including sending by the MS and receiving by the MS.

It should also be understood that, before the operation that the MS transmits the present service by means of the first resource allocation parameter set in the semi-static scheduling manner, the method may further include that the MS receives third control signaling sent by the network equipment, the third control signaling being configured to indicate the MS to transmit the service by means of the first resource allocation parameter set in the semi-static scheduling manner.

In combination with the first aspect, in a first possible implementation mode, the second resource allocation parameter set may be determined by the network equipment according to requirement(s) of a second service which is newly added and requirement(s) of a first service which is transmitted at present, the first control signaling may be configured to indicate the MS to transmit the service with the different requirement(s) by means of the second resource allocation parameter set instead of the first resource allocation parameter set in the semi-static scheduling manner. The operation that the MS transmits the service with the different requirement(s) according to the first control signaling may include that the MS transmits the first service and the second service by means of the second resource allocation parameter set.

In combination with the first aspect, in a second possible implementation mode, the second resource allocation parameter set may be determined by the network equipment according to the requirement(s) of the second service which is newly added, the first control signaling may be configured to indicate the MS to transmit the service with the different requirement(s) by means of the second resource allocation parameter set and the first resource allocation parameter set in the semi-static scheduling manner. The operation that the MS transmits the service with the different requirement(s) according to the first control signaling may include that the MS transmits the first service by means of the first resource allocation parameter set; and the MS transmits the second service by means of the second resource allocation parameter set. Herein the first control signaling may include a first information field and a second information field, the first information field may be configured to include information of the first resource allocation parameter set, and the second information field may be configured to include information of the second resource allocation parameter set.

In combination with the first aspect, in a third possible implementation mode, the second resource allocation parameter set may be determined by the network equipment according to a change in the requirement(s) of the first service which is transmitted at present, the first control signaling may be configured to indicate the MS to transmit the service with the different requirement(s) by means of the second resource allocation parameter set instead of the first resource allocation parameter set in the semi-static scheduling manner. The operation that the MS transmits the service with the different requirement(s) according to the first control signaling may include that the MS transmits the first service with the different requirement(s) by means of the second resource allocation parameter set instead of the first resource allocation parameter set.

In a possible implementation mode, before the operation that the MS receives the first control signaling sent by the network equipment, the method may further include that the MS receives second control signaling sent by the network equipment, the second control signaling being configured to indicate N resource allocation parameter sets and the N resource allocation parameter sets including the first resource allocation parameter set and the second resource allocation parameter set.

Preferably, the second control signaling may be Radio Resource Control (RRC) signaling.

In a possible implementation mode, the network equipment and the MS may store a one-to-one correspondence between the N resource allocation parameter sets and N indexes, and the second control signaling may include the N indexes.

A second aspect provides a method for transmitting a service, which may include that network equipment determines a second resource allocation parameter set according to a change in a service requirement of an MS, wherein the MS may transmit a service at present by means of a first resource allocation parameter set in an semi-static scheduling manner, and each of the first resource allocation parameter set and the second resource allocation parameter set may include at least one resource allocation parameter. The network equipment sends first control signaling to the MS, the first control signaling being configured to indicate the MS to transmit a service with different requirement(s) by means of the second resource allocation parameter set instead of the first resource allocation parameter set or transmit the service with the different requirement(s) by means of the second resource allocation parameter set and the first resource allocation parameter set in the semi-static scheduling manner.

It should be understood that, before the operation that the network equipment determines the second resource allocation parameter set according to the change in the service requirement of the MS, the method may further include that:

the network equipment sends third control signaling to the MS, the third control signaling being configured to indicate the MS to transmit the service by means of the first resource allocation parameter set in the semi-static scheduling manner.

In combination with the second aspect, in a first possible implementation mode, the operation that the network equipment determines the second resource allocation parameter set according to the change in the service requirement of the MS may include that: the network equipment determines the second resource allocation parameter set configured to transmit a first service and a second service according to requirement(s) of the second service which is newly added and requirement(s) of the first service which is transmitted at present. The first control signaling is configured to indicate the MS to transmit the first service and the second service by means of the second resource allocation parameter set instead of the first resource allocation parameter set in the semi-static scheduling manner.

In combination with the second aspect, in a second possible implementation mode, the operation that the network equipment determines the second resource allocation parameter set according to the change in the service requirement of the MS may include that: the network equipment determines the second resource allocation parameter set configured to transmit the second service according to the requirement(s) of the second service which is newly added; and the network equipment determines to transmit the first service still by means of the first resource allocation parameter set. The first control signaling is configured to indicate the MS to transmit the first service by means of the first resource allocation parameter set and transmit the second service by means of the second resource allocation parameter set in the semi-static scheduling manner. The first control signaling may include a first information field and a second information field, the first information field may be configured to include information of the first resource allocation parameter set, and the second information field may be configured to include information of the second resource allocation parameter set.

In combination with the second aspect, in a third possible implementation mode, the operation that the network equipment determines the second resource allocation parameter set according to the change in the service requirement of the MS may include that: the network equipment determines the second resource allocation parameter set configured to transmit the first service with different requirement(s) according to a change in the requirement(s) of the first service which is transmitted at present. The first control signaling is configured to indicate the MS to transmit the first service with the different requirement(s) by means of the second resource allocation parameter set instead of the first resource allocation parameter set in the semi-static scheduling manner.

In a possible implementation mode, before the operation that the network equipment determines the second resource allocation parameter set according to the change in the service requirement of the MS, the method may further include that the network equipment sends second control signaling to the MS, the second control signaling being configured to indicate N resource allocation parameter sets and the N resource allocation parameter sets including the first resource allocation parameter set and the second resource allocation parameter set.

Preferably, the second control signaling may be RRC signaling.

In a possible implementation mode, the network equipment and the MS may store a one-to-one correspondence between the N resource allocation parameter sets and N indexes, and the second control signaling may include the N indexes.

A third aspect provides a MS, which includes a receiving module and a processing module, configured to execute the first aspect and the corresponding implementation modes thereof.

A fourth aspect provides a MS, which includes a processor, a transceiver and a memory, configured to execute the first aspect and the corresponding implementation modes thereof and each component of the MS of the fourth aspect may correspond to the corresponding module of the MS of the third aspect.

A fifth aspect provides network equipment, which includes a sending module and a processing module, configured to execute the second aspect and the corresponding implementation modes thereof.

A sixth aspect provides network equipment, which includes a processor, a transceiver and a memory, configured to execute the first aspect and the corresponding implementation modes thereof, and each component of the network equipment of the sixth aspect may correspond to the corresponding module of the network equipment of the fifth aspect.

In the disclosure, the resource allocation parameters in the resource allocation parameter sets may include at least one of a transmission period, sizes of transmission blocks, a number of the transmission blocks, locations of the transmission blocks, an uplink power control parameter, a Modulation and Coding Scheme (MCS) or a number of Hybrid Automatic Repeat reQuest (HARQ) processes.

In the disclosure, the first control signaling may preferably indicate the second resource allocation parameter set through an index.

In the disclosure, the index may include a number or a Radio Network Temporary Identity (RNTI).

In the disclosure, the first control signaling may be a PDCCH.

According to the method for transmitting a service, the MS and the network equipment of the embodiments of the disclosure, the MS transmits the present service by means of the first resource allocation parameter set in the semi-static scheduling manner, and when the requirement(s) of the service is changed, the network equipment indicates the MS through control signaling to transmit the service with the different requirement(s) by means of the second resource allocation parameter set instead of the first resource allocation parameter set or transmit the service with the different requirement(s) by both the second resource allocation parameter set and the first resource allocation parameter set, so that semi-static scheduling reconfiguration may be completed through relatively less control signaling, thereby reducing a signaling overhead.

BRIEF DESCRIPTION OF DRAWINGS

In order to describe the technical solutions of the embodiments of the disclosure more clearly, the drawings required to be used in the descriptions about the embodiments or the related art will be simply introduced below. Obviously, the drawings described below are only some embodiments of the disclosure. Other drawings may further be obtained by those skilled in the art according to these drawings without creative work.

FIG. 8 is a schematic flowchart of a method for transmitting a service according to yet another embodiment of the disclosure.

DETAILED DESCRIPTION

Figure 1:
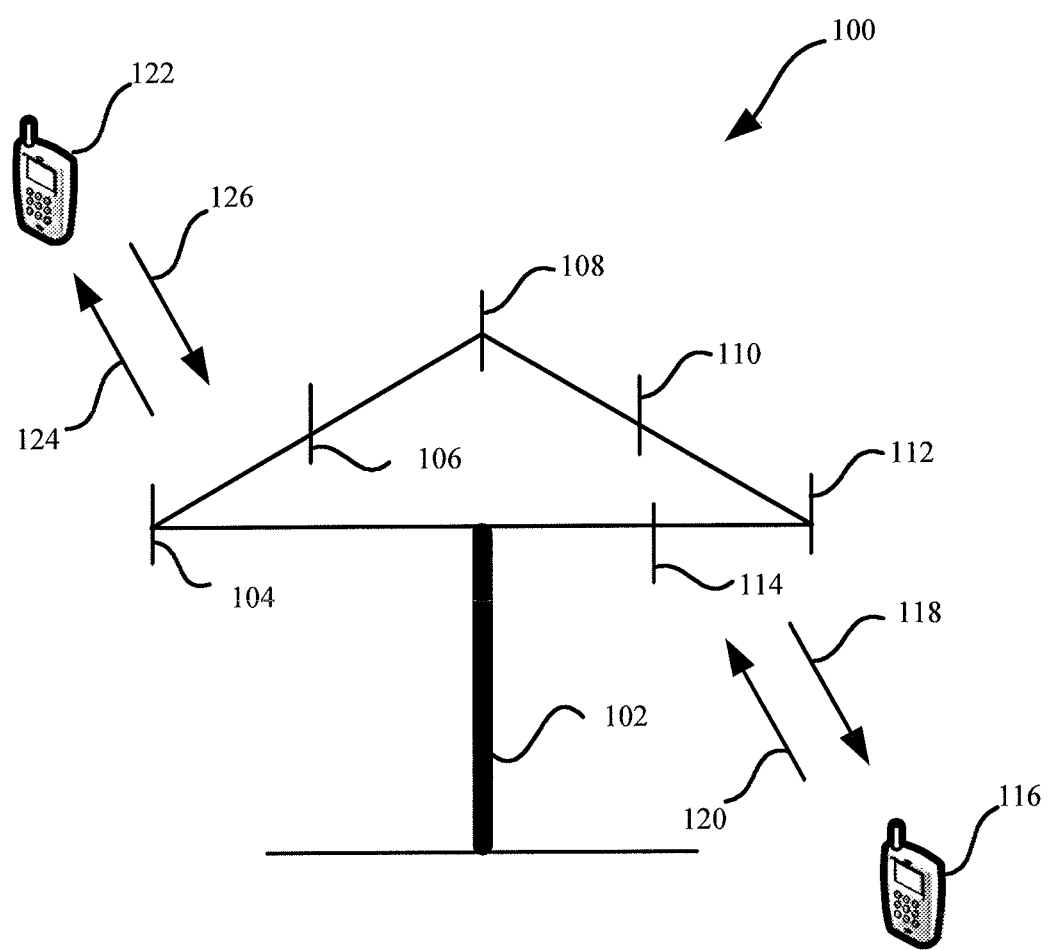
FIG. 1 is a schematic diagram of an example of a communication system applying a method for transmitting a service according to an embodiment of the disclosure.

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those skilled in the art based on the embodiments in the disclosure without creative work shall fall within the scope of protection of the disclosure.

Terms "part", "module", "system" or the like used in the specification are adopted to represent a computer related entity, hardware, firmware, hardware and software combination, software or software in execution. For example, a part may be, but not limited to, a process running on a processor, the processor, an object, an executable file, an execution thread, a program and/or a computer. The drawings show that both an application running on computing equipment and the computing equipment may be parts. One or more parts may reside in a process and/or an execution thread, and the parts may be located on a computer and/or distributed between two or more computers. In addition, these parts may be executed from various computer-readable media with various data structures stored thereon. The parts may communicate through local and/or remote processes according to signals with one or more data groups (for example, data from two parts interacting with another part of a local system, a distributed system and/or a network, for example, the Internet interacting with another system through a signal).

Each embodiment of the disclosure is described in combination with an MS. The MS may also be called User Equipment (UE), terminal equipment, an access terminal, a user unit, a user ST, a mobile radio ST, a remote ST, a remote terminal, mobile equipment, a user terminal, a terminal, wireless communication equipment, a user agent or a user device. The MS may be an ST in a Wireless Local Area Network (WLAN), and may be a cell phone, a cordless phone, a Session Initiation Protocol (SIP) phone, a Wireless Local Loop (WLL) ST, a Personal Digital Assistant (PDA), handheld equipment with a wireless communication function, computing equipment, other processing equipment connected to a wireless modem, vehicle-mounted equipment, wearable equipment, an MS in a future 5G network, an MS in a future evolved Public Land Mobile Network (PLMN) or the like.

In addition, each embodiment of the disclosure is described in combination with network equipment. The network equipment may be equipment configured to communicate with the MS, and the network equipment may be an Access Point (AP) in the WLAN, a Base Transceiver Station (BTS) in a Global System for Mobile Communication (GSM) or Code Division Multiple Access (CDMA), may also be a NodeB (NB) in Wideband Code Division Multiple Access (WCDMA), and may further be an Evolutional Node B (eNB or eNodeB) in LTE, or a relay ST or AP, or vehicle-mounted equipment, wearable equipment, network equipment in the future 5G network, network equipment in the future evolved PLMN or the like.

Preferably, the network equipment in each embodiment of the disclosure is a base station, and the MS in each embodiment of the disclosure is UE.

In addition, each aspect or characteristic of the disclosure may be implemented into a method, a device or a product programed with a standard and/or using an engineering technology. The term "product" used in the application covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD), a Digital Versatile Disk (DVD)), a smart card and a flash memory (for example, an Erasable Programmable Read-Only Memory (EPROM), a card, a stick or a key driver). In addition, various storage media described in the disclosure may represent one or more pieces of equipment and/or other machine-readable media configured to store information. The term "machine-readable medium" may include, but not limited to, a wireless channel and various other media capable of storing, including and/or including instructions and/or data.

FIG. 1 is a schematic diagram of a communication system for transmitting a service according to an embodiment of the disclosure. As shown in FIG. 1, the communication system 100 includes network equipment 102, and the network equipment 102 may include multiple antennas, for example, antennas 104, 106, 108, 110, 112 and 114. In addition, the network equipment 102 may additionally include a sender chain and a receiver chain. Those of ordinary skilled in the art may know that all of them may include multiple parts (for example, a processor, a modulator, a multiplexer, a demodulator, a demultiplexer or an antenna) related to signal sending and receiving.

The network equipment 102 may communicate with multiple pieces of terminal equipment (for example, terminal equipment 116 and terminal equipment 122). However, it can be understood that the network equipment 102 may communicate with any amount of terminal equipment like the terminal equipment 116 or 122. The terminal equipment 116 and 122 may be, for example, cell phones, smart phones, portable computers, handheld communication equipment, handheld computing equipment, satellite radio devices, global positioning systems, PDAs and/or any other proper equipment configured for communication on the wireless communication system 100.

As shown in FIG. 1, the terminal equipment 116 communicates with the antennas 112 and 114. The antennas 112 and 114 send information to the terminal equipment 116 through a forward link 118 and receive information from the terminal equipment 116 through a reverse link 120. In addition, the terminal equipment 122 communicates with the antennas 104 and 106. The antennas 104 and 106 send information to the terminal equipment 122 through a forward link 124 and receive information from the terminal equipment 122 through a reverse link 126.

For example, in a Frequency Division Duplex (FDD) system, for example, the forward link 118 may use a frequency band different from that used by the reverse link 120, and the forward link 125 may use a frequency band different from that used by the reverse link 126.

For another example, in a Time Division Duplex (TDD) system and a full duplex system, the forward link 118 and the reverse link 120 may use the same frequency band, and the forward link 124 and the reverse link 126 may use the same frequency band.

Each antenna (or antenna group formed by multiple antennas) and/or region designed for communication is called a sector of the network equipment 102. For example, the antenna group may be designed to communicate with terminal equipment in a sector of coverage area of the network equipment 102. In a process that the network equipment 102 communicates with the terminal equipment 116 and 122 through the forward links 118 and 124 respectively, a sending antenna of the network equipment 102 may use beamforming to improve signal noise ratios of the forward links 118 and 124. In addition, compared with a manner that the network equipment sends signals to all its terminal equipment through a single antenna, when the network equipment 102 sends signals to the terminal equipment 116 and 122 randomly scattered in the related coverage area by means of beamforming, mobile equipment in an adjacent cell may be interfered less.

In a given time, the network equipment 102, the terminal equipment 116 or the terminal equipment 122 may be a wireless communication sending device and/or a wireless communication receiving device. When data is sent, the wireless communication sending device may code the data for transmission. Specifically, the wireless communication sending device may acquire (for example, generation, receiving from another communication device or storage in a memory) a certain number of data bits to be sent to the wireless communication receiving device through a channel. The data bits may be included in a transmission block (or multiple transmission blocks) of the data, and the transmission block may be segmented to generate multiple code blocks.

In addition, the communication system 100 may be a PLMN or a Device-to-Device (D2D) network or a Machine-to-Machine (M2M) network or a Vehicle-to-Vehicle (V2V) network or a V2X network or another network. FIG. 1 is only a simplified schematic diagram listed as an example, and the network may further include other network equipment which is not drawn in FIG. 1.

The solutions of the embodiments of the disclosure may be applied to an existing cellular communication system, for example, systems of a GSM, WCDMA and LTE, and supported communication mainly includes voice and data communication. Generally speaking, connections supported by a conventional base station are limited in quantity and easy to implement.

A next-generation mobile communication system will not only support conventional communication but also support M2M communication or MTC. It is predicted that, by 2020, MTC equipment connected to networks will reach 500 to 1,000 hundred million, which will be far larger than existing connections. M2M services have greatly different network requirements due to their greatly different service types.

In an LTE system, a semi-static scheduling mechanism formulates a semi-static scheduling manner mainly for transmission of a periodic service, for example, a typical VoLTE service, and its main mechanism is with respect to network-side equipment. For example, a base station performs corresponding semi-static scheduling resource configuration on an MS through RRC signaling at first. For example, multiple groups of resource allocation parameters for semi-static scheduling are configured, and the resource allocation parameters may include a transmission period, sizes of transmission blocks, locations and number of the transmission blocks, a transmitted power control parameter, the number of HARQ processes or the like; and then, when necessary, a group of resource allocation parameters to be used are actually allocated to the MS through a PDCCH, and the resource allocation parameters are periodically valid once being activated. In the LTE system, a size of each data packet in the VoLTE service is dozens of bytes and a period thereof is fixed. Accordingly, adopting the semi-static scheduling mechanism may save control signaling to a certain extent.

Figure 2:
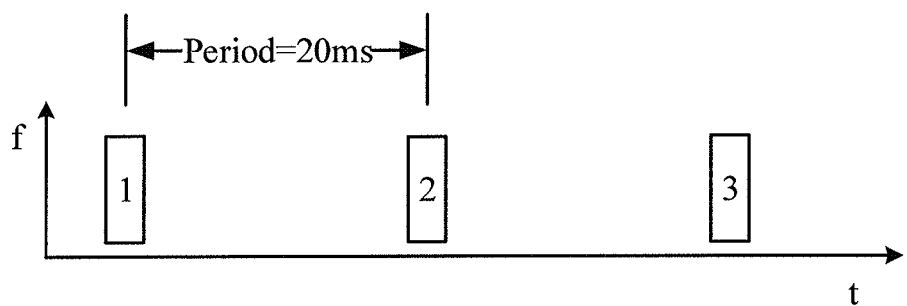
FIG. 2 is a schematic diagram of a semi-static scheduling workflow.

FIG. 2 specifically shows a schematic diagram of a semi-static scheduling workflow. In FIG. 2, the transmission period in the resource allocation parameters allocated to the MS is 20 ms, and 3 transmission blocks (here, the number of the transmission blocks is only schematic) are shown in the figure. After resources allocated to the MS are activated, since no PDCCH will subsequently be sent, it is impossible to change the transmission period and the sizes of the transmission blocks or the like, and resources may only be reconfigured in a manner of activation after releasing.

In a future LTE-advanced and 5G systems, along with gradual increase of periodic services, there may be more and more scenarios where the semi-static scheduling mechanism is adopted, specifically including, but not limited to, the following scenarios.

In a first scenario, in MBB services, multiple types of periodic services are transmitted together. For example, a VoLTE service, instant messaging heartbeat data or the like may be transmitted together. In these scenarios, a network may trigger one or more semi-static scheduling configurations and resource allocation manners, that is, a group of resource allocation parameters are allocated, and the resource allocation parameters are updated when necessary.

In a second scenario, in low-power-consumption massive MTC services, the network is required to periodically perform data transmission, an MS is also required to periodically perform data transmission, and sizes of data packets may be changed.

In a third scenario, in low-latency and ultra-reliable Internet of things services, particularly in a V2X service scenario, either a vehicle or a network is required to periodically broadcast a vehicle state in the network, and sizes of data packets are variable.

Figure 3:
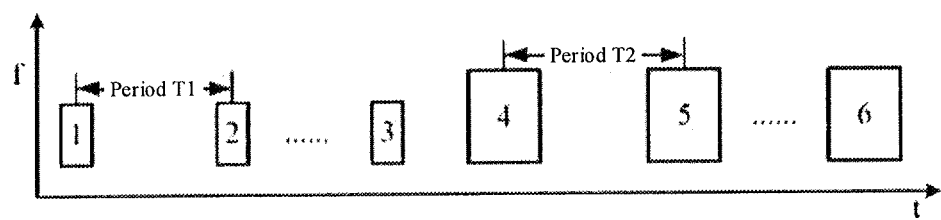
FIG. 3 is a schematic diagram of semi-static scheduling configuration in case of a change in requirement(s) of a service.

These three scenarios may correspond to a service requirement change shown in FIG. 3. For example, an original semi-static scheduling configuration requirement of a service is shown as transmission blocks 1 to 3, and a transmission period is T1. After the requirement of the service is changed, the requirement is shown as transmission blocks 4 to 6, and the transmission period is T2. It should be understood that sizes and number of the transmission blocks are only schematic and not intended to limit the embodiments of the disclosure.

At first, a resource allocation parameter set and resource allocation parameters used for semi-static scheduling in the embodiments of the disclosure will be described in detail.

In the embodiments of the disclosure, the resource allocation parameters are configured for periodic resource scheduling (or periodic resource allocation), or, the resource allocation parameters may be parameters related to periodic resource scheduling. As an example rather than a limitation, the resource allocation parameters in each resource allocation parameter set include at least one of:

a transmission period, sizes of transmission blocks, a number of the transmission blocks, locations of the transmission blocks, an uplink power control parameter, an MCS or a number of HARQ processes.

Specifically, the transmission period may refer to a time interval at which an MS (or network equipment) continuously transmits (sends or receives) data, information or the like twice for the same service. As an example rather than a limitation, the transmission period may be 20 ms, 10 ms or 5 ms.

It is noted that, in the embodiments of the disclosure, an object for data or information transmission (sending or receiving) of the MS (or the network equipment) may be network equipment and may also be another MS or the like, which is not specially limited in the disclosure. When the MS sends data or information to the network equipment, the transmission period may be an uplink transmission period. When the MS receives data or information sent by the network equipment, the transmission period may be a downlink transmission period.

In the embodiments of the disclosure, the sizes of the transmission blocks refer to sizes of time-frequency Resource Blocks (RBs) occupied by once data transmission of the MS (or the network equipment). For example, M symbol lengths on a time domain and N RBs on a frequency domain form a transmission block.

It should be understood that the sizes of the transmission blocks in the embodiments of the disclosure may correspond to sizes of data packets of a service, to be transmitted every time. Preferably, the transmission blocks may include data packets which are transmitted at one time.

In the embodiments of the disclosure, the number of the transmission blocks refers to a number of continuous transmission times when the same semi-static scheduling configuration is used for transmitting a service. The number of the transmission blocks may also be represented by a number of continuous Transmission Time Intervals (TTIs) used for transmitting a service, which will not be limited in the embodiments of the disclosure.

In the embodiments of the disclosure, the locations of the transmission blocks refer to locations of the transmission blocks on the time domain and the frequency domain, for example, the specific symbols and specific RBs where the transmission blocks start with.

In the embodiments of the disclosure, the resource allocation parameter sets may further include the MCS used for modulation signals during transmitting a service.

The uplink power control parameter is a related parameter of transmitted power used when the MS sends the data, the information or the like once or for multiple times. As an example rather than a limitation, the uplink power control parameter in the embodiments of the disclosure may be a maximum value of transmitted power which may be used by the MS.

At present, a stop-and-wait HARQ protocol is widely used, so that it is necessary to configure a corresponding number of HARQ processes. In a process of waiting for feedback information of a certain HARQ process, another idle process may be continuously used to transmit a data packet. A minimum Round Trip Time (RTT) of HARQ is defined as a completion time of a data packet transmission process, and includes the whole process that a data packet is started to be sent at a sender, a receiver feeds back Acknowledgement (ACK)/Negative Acknowledgement (NACK) signaling according to a result after receiving and processing and the sender determines to perform retransmission or transmit a new data packet in a next frame after demodulating and processing the ACK/NACK signaling. The number of HARQ processes is closely related to the minimum RTT of HARQ. For FDD, its number of HARQ processes is equal to a number of subframes included in a minimum RTT of HARQ. For TDD, its number of HARQ processes is a number of subframes in the same sending direction in a minimum RTT of HARQ.

It should be understood that the specific parameters included in the resource allocation parameters listed above are only exemplarily described and not intended to limit the disclosure, and other parameters related to periodic resource scheduling or periodic resource allocation all fall within the scope of protection of the disclosure.

It is noted that, in the embodiments of the disclosure, types of resource allocation parameters included in a resource allocation parameter set are not specially limited. For example, a resource allocation parameter set may include all the resource allocation parameters listed above, or a resource allocation parameter set may include part of the resource allocation parameters listed above, and moreover, types and numbers of resource allocation parameters included in each resource allocation parameter set in "N resource allocation parameter sets" mentioned hereinafter may be the same and may also be different, which is not specially limited in the disclosure.

Figure 4:
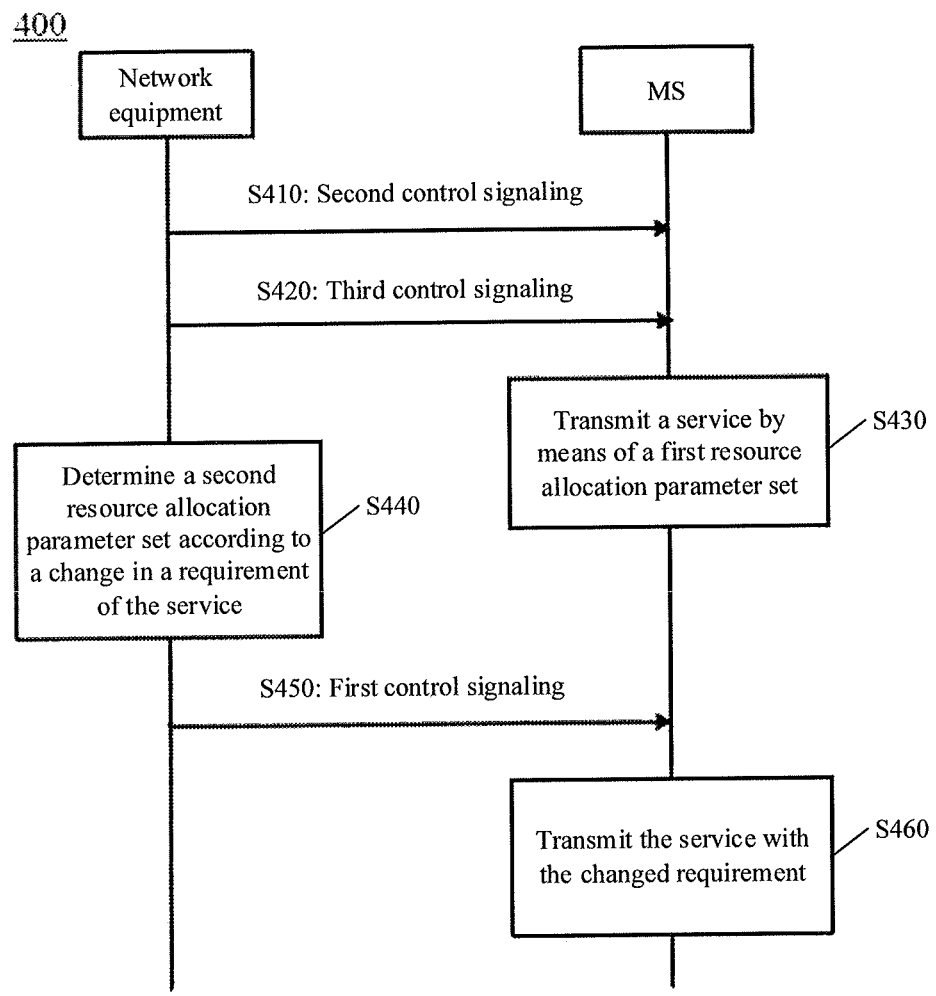
FIG. 4 is a schematic flowchart of a method for transmitting a service according to an embodiment of the disclosure.

FIG. 4 is a schematic flowchart of a method 400 for transmitting a service according to an embodiment of the disclosure. The method 400 is executed between network equipment and an MS, and may include the following steps.

In S401, the network equipment sends second control signaling to the MS, the second control signaling being configured to indicate N resource allocation parameter sets and the N resource allocation parameter sets including a first resource allocation parameter set and a second resource allocation parameter set. Correspondingly, the MS receives the second control signaling sent by the network equipment.

Herein, each of the first resource allocation parameter set and the second resource allocation parameter set is a resource allocation parameter set allocated to the MS by the network equipment and configured to semi-static scheduling, and each of the first resource allocation parameter set and the second resource allocation parameter set includes at least one resource allocation parameter.

The second control signaling may be high-layer control signaling. Preferably, the second control signaling is RRC signaling.

In a preferred embodiment, a one-to-one correspondence, determined by negotiation, between multiple sets of semi-static scheduling configurations (multiple resource allocation parameter sets) and multiple indexes is stored in the network equipment and the MS, wherein the one-to-one correspondence between the multiple resource allocation parameter sets and the multiple indexes includes a one-to-one correspondence between the N resource allocation parameter sets and N indexes. That is, the network equipment and the MS store the one-to-one correspondence between the N resource allocation parameter sets and the N indexes. When the second control signaling includes the N indexes, the N resource allocation parameter sets may be indicated. When subsequently indicating the first resource allocation parameter set and the second resource allocation parameter set, third control signaling and first control signaling may also indicate them through indexes.

It should be understood that, in the embodiment of the disclosure, the resource allocation parameters indicated by the second control signaling may only include part of resource allocation parameters listed above. Specific contents of the other parameters are transmitted through the first control signaling in S405.

It should be understood that S401 is optional, the network equipment and the MS may not store the one-to-one correspondence between the multiple resource allocation parameter sets and the multiple indexes, and the network equipment subsequently directly sends specific contents of the resource allocation parameter sets to the MS or directly sends a specific content of each resource allocation parameter to the MS (without indication through indexes), which will not be limited in the embodiment of the disclosure.

In S402, the network equipment sends third control signaling to the MS, the third control signaling being configured to indicate the MS to transmit a service by means of the first resource allocation parameter set in a semi-static scheduling manner. Correspondingly, the MS receives the third control signaling sent by the network equipment.

Specifically, the third control signaling is configured to indicate the MS to transmit a present service, namely transmitting a first service, by means of the first resource allocation parameter set in the semi-static scheduling manner.

It should be understood that S402 is also optional, that is, how the MS enters the semi-static scheduling manner for data transmission will not be limited in the embodiment of the disclosure.

In S403, the MS transmits the present service by means of the first resource allocation parameter set in the semi-static scheduling manner. That is, the MS transmits the present first service by means of the first resource allocation parameter set.

In S404, when a requirement of the service which is transmitted by the MS at present is changed, the network equipment determines the second resource allocation parameter set according to a change in the service requirement of the MS.

Specifically, the operation that the network equipment determines the second resource allocation parameter set according to the change in the service requirement of the MS includes the following situations.

A first situation is for the change in the requirement of the service which is transmitted at present, and may specifically be as follows. The network equipment determines the second resource allocation parameter set configured to transmit the first service with a changed requirement according to the change in the requirement of the first service which is transmitted at present. Correspondingly, the first control signaling sent to the MS by the network equipment in S405 is configured to indicate the MS to transmit the first service with the changed requirement by means of the second resource allocation parameter set instead of the first resource allocation parameter set in the semi-static scheduling manner.

Figure 5:
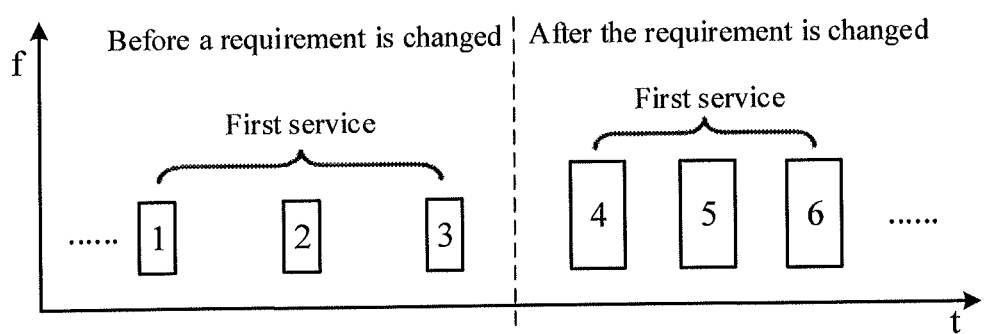
FIG. 5 is a schematic diagram of a method for transmitting a service according to an embodiment of the disclosure.

A specific example may be shown in FIG. 5. Before the requirement is changed, the first service is transmitted through transmission blocks 1, 2 and 3. The change in the requirement may be increase of a size of a data packet and shortening of a transmission period. After the requirement is changed, the first service is transmitted through transmission blocks 4, 5 and 6.

A second situation is for a newly added service, and may specifically be as follows. The network equipment determines the second resource allocation parameter set configured to transmit the first service and a second service according to requirement(s) of the second service which is newly added and the requirement(s) of the first service which is transmitted at present. Correspondingly, the first control signaling is configured to indicate the MS to transmit the first service and the second service by means of the second resource allocation parameter set instead of the first resource allocation parameter set in the semi-static scheduling manner.

Figure 6:
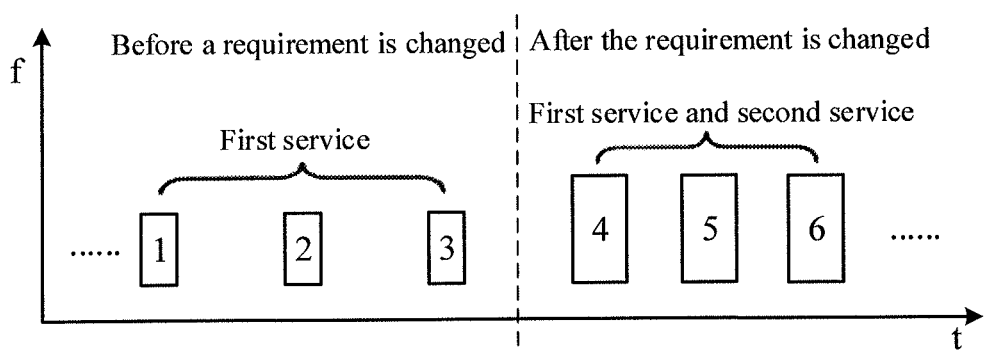
FIG. 6 is a schematic diagram of a method for transmitting a service according to another embodiment of the disclosure.

A specific example may be shown in FIG. 6. Before the requirement(s) is changed, the first service is transmitted through the transmission blocks 1, 2 and 3. The change in the requirement(s) may be the second service which is newly added. After the requirement(s) is changed, the network equipment determines to transmit the first service and the second service through the transmission blocks 4, 5 and 6 according to the requirement(s).

A third situation is also for the newly added service, and may specifically be as follows. The network equipment determines the second resource allocation parameter set configured to transmit the second service according to the requirement(s) of the second service which is newly added; and the network equipment determines to transmit the first service still by means of the first resource allocation parameter set. Correspondingly, the first control signaling is configured to indicate the MS to transmit the first service by means of the first resource allocation parameter set and transmit the second service by means of the second resource allocation parameter set in the semi-static scheduling manner.

Figure 7:
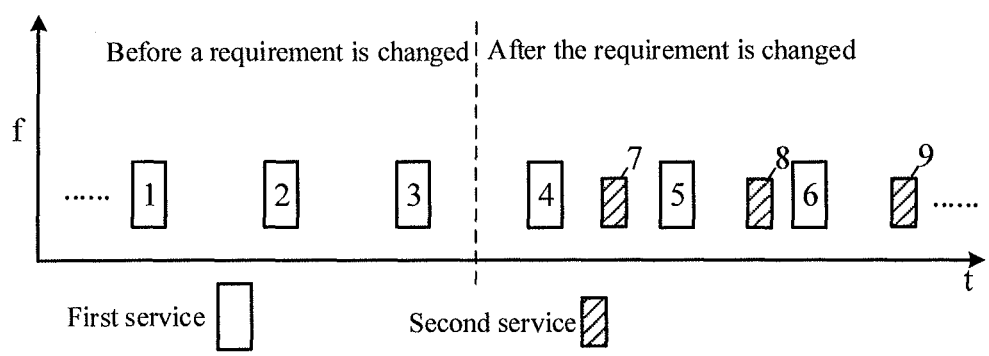
FIG. 7 is a schematic diagram of a method for transmitting a service according to still another embodiment of the disclosure.

A specific example may be shown in FIG. 7. Before the requirement(s) is changed, the first service is transmitted through the transmission blocks 1, 2 and 3. The change in the requirement(s) may be the second service which is newly added. After the requirement(s) is changed, the network equipment determines to transmit the first service through the transmission blocks 4, 5 and 6 and transmit the second service through transmission blocks 7, 8 and 9 according to the requirement(s), wherein resource allocation parameter sets corresponding to the transmission blocks 4, 5 and 6 and the transmission blocks 1, 2 and 3 are both the first resource allocation parameter set. That is, the first service is transmitted still by means of the first resource allocation parameter set. A resource allocation parameter set corresponding to the transmission blocks 7, 8 and 9 is a resource allocation parameter set different from the transmission blocks 1 to 6. That is, the second service is transmitted by means of the second resource allocation parameter set.

In S405, the network equipment sends first control signaling to the MS, the first control signaling being configured to indicate the MS to transmit a service with different requirement(s) by means of the second resource allocation parameter set instead of the first resource allocation parameter set or transmit the service with the different requirement(s) by means of the second resource allocation parameter set and the first resource allocation parameter set in the semi-static scheduling manner. Correspondingly, the MS receives the first control signaling sent by the network equipment.

It should be understood that, under the condition that the MS receives the second control signaling and has acquired the one-to-one correspondence between the resource allocation parameter sets indicated by the second control signaling and the indexes, the resource allocation parameter sets indicated by the second control signaling may only include part of parameters of the resource allocation parameters listed above (for example, parameters of sizes of transmission blocks and locations of the transmission blocks). The first control signaling indicates the part of parameters through corresponding indexes, and specific contents of the other part of parameters are directly transmitted through the first control signaling.

Specifically, for example, part of the first control signaling may include an index indicating the second resource allocation parameter set (including such parameters as the sizes of the transmission blocks, the locations of the transmission blocks or the like), and the other part may further include the specific contents of the other parameters of the resource allocation parameters listed above.

In the disclosure, setting of the parameters in the resource allocation parameter set, setting of the indexes and setting of each piece of control signaling may be very flexible and not limited to forms listed in the embodiment of the disclosure.

In S406, the MS transmits the service with the different requirement(s) according to the first control signaling.

For the first situation, the second resource allocation parameter set is determined by the network equipment according to the change in the requirement(s) of the first service which is transmitted at present, and the first control signaling is configured to indicate the MS to transmit the service with the different requirement(s) by means of the second resource allocation parameter set instead of the first resource allocation parameter set in the semi-static scheduling manner.

The operation that the MS transmits the service with the different requirement(s) according to the first control signaling includes that: the first service with the different requirement(s) is transmitted by means of the second resource allocation parameter set.

In this process, the MS may release the first resource allocation parameter set. It should be understood that, in the embodiment, the network equipment is not required to send a PDCCH to the MS to indicate the first resource allocation parameter set to be released and then send another PDCCH to indicate the second resource allocation parameter set to be configured. Instead, the second resource allocation parameter set is directly used instead of the first resource allocation parameter set, so that a signaling overhead may be reduced.

For the second situation, the second resource allocation parameter set is determined by the network equipment according to the requirement(s) of the second service which is newly added and the requirement(s) of the first service which is transmitted at present, and the first control signaling is configured to indicate the MS to transmit the service with the different requirement(s) by means of the second resource allocation parameter set instead of the first resource allocation parameter set in the semi-static scheduling manner.

The operation that the MS transmits the service with the different requirement(s) according to the first control signaling includes that: the MS transmits the first service and the second service by means of the second resource allocation parameter set.

In this process, the MS may release the first resource allocation parameter set. It should be understood that, in the embodiment, the network equipment is not required to send a PDCCH to the MS to indicate the first resource allocation parameter set to be released and then send another PDCCH to indicate the second resource allocation parameter set to be configured. Instead, the first service and the second service are directly transmitted by means of the second resource allocation parameter set instead of the first resource allocation parameter set, so that the signaling overhead may be reduced.

For the third situation, the second resource allocation parameter set is determined by the network equipment according to the requirement(s) of the second service which is newly added, and the first control signaling is configured to indicate the MS to transmit the service with the different requirement(s) by means of the second resource allocation parameter set and the first resource allocation parameter set in the semi-static scheduling manner.

The operation that the MS transmits the service with the different requirement(s) according to the first control signaling includes that: the MS transmits the first service by means of the first resource allocation parameter set; and the MS transmits the second service by means of the second resource allocation parameter set.

Under the third situation, the first control signaling may include a first information field and a second information field. The first information field is configured to include information of the first resource allocation parameter set, and the second information field is configured to include information of the second resource allocation parameter set. Specifically, for example, a semi-static scheduling configuration (the first resource allocation parameter set) of the first service is carried by an RNTI1, and a semi-static scheduling configuration (the second resource allocation parameter set) of the second service is carried by a semi-static scheduling-RNTI2. For another example, the semi-static scheduling configuration (the first resource allocation parameter set) of the first service is indicated by an Index1, and the semi-static scheduling configuration (the second resource allocation parameter set) of the second service is indicated by means of an Index2. Specific indication and including manners will not be limited in the disclosure. For the MS, after receiving the first control signaling, the MS transmits (sends or receives) data on all resources corresponding to the first resource allocation parameter set and second resource allocation parameter set indicated by the first information field and the second information field respectively.

In the embodiment of the disclosure, the third control signaling may indicate the first resource allocation parameter set through an index (for example, a first index). The first control signaling may indicate the second resource allocation parameter set through an index (for example, a second index).

It should be understood that transmission of the disclosure includes uplink transmission and downlink transmission, namely including sending by the MS and receiving by the MS.

It should be understood that the method of the embodiment of the disclosure may also be called a semi-static scheduling reconfiguration method.

It should also be understood that the index of the embodiment of the disclosure, for example, any index in the N indexes, the first index and the second index, may be a number or an RNTI. That is, a number or an RNTI is configured to contain an index representing a resource allocation parameter set (for example, any resource allocation parameter set in the N resource allocation parameter sets, the first resource allocation parameter set and the second resource allocation parameter set).

It should further be understood that, in the embodiment of the disclosure, the third control signaling and/or the first control signaling may preferably be PDCCHs/a PDCCH. In addition, the third control signaling and/or the first control signaling may also be other physical control channels, for example, an Enhanced PDCCH (E-PDCCH), which will not be limited in the embodiment of the disclosure.

According to the method of the embodiment of the disclosure for transmitting a service, the MS transmits the present service by means of the first resource allocation parameter set in the semi-static scheduling manner, and when the requirement(s) of the service is changed, the network equipment indicates the MS through control signaling to transmit the service with the different requirement(s) by means of the second resource allocation parameter set instead of the first resource allocation parameter set or transmit the service with the different requirement(s) by both the second resource allocation parameter set and the first resource allocation parameter set, so that semi-static scheduling reconfiguration may be completed through relatively less control signaling, and the signaling overhead may be reduced.

A method 800 of the embodiments of the disclosure for transmitting a service will be described below in detail from the angle of an MS in combination with FIG. 8. The method 800 includes the following operations.

In S810, the MS transmits a present service by means of a first resource allocation parameter set in a semi-static scheduling manner.

In S820, the MS receives first control signaling sent by network equipment, the first control signaling being configured to indicate the MS to transmit a service with different requirement(s) by means of a second resource allocation parameter set instead of the first resource allocation parameter set or transmit the service with the different requirement(s) by means of the second resource allocation parameter set and the first resource allocation parameter set in the semi-static scheduling manner.

In S830, the MS transmits the service with the different requirement(s) according to the first control signaling, wherein each of the first resource allocation parameter set and the second resource allocation parameter set includes at least one resource allocation parameter.

It should be understood that, before the operation that the MS transmits the present service by means of the first resource allocation parameter set in the semi-static scheduling manner in S810, the method 800 may further include that:

the MS receives third control signaling sent by the network equipment, the third control signaling being configured to indicate the MS to transmit the service by means of the first resource allocation parameter set in the semi-static scheduling manner.

Optionally, as an embodiment, the second resource allocation parameter set is determined by the network equipment according to a change in requirement(s) of a first service which is transmitted at present, the first control signaling is configured to indicate the MS to transmit the service with the different requirement(s) by means of the second resource allocation parameter set instead of the first resource allocation parameter set in the semi-static scheduling manner, and the operation that the MS transmits the service with the different requirement(s) according to the first control signaling in S830 may include that:

the MS transmits the first service with different requirement(s) by means of the second resource allocation parameter set instead of the first resource allocation parameter set.

Optionally, as another embodiment, the second resource allocation parameter set may be determined by the network equipment according to requirement(s) of a second service which is newly added and the requirement(s) of the first service which is transmitted at present, the first control signaling may be configured to indicate the MS to transmit the service with the different requirement(s) by means of the second resource allocation parameter set instead of the first resource allocation parameter set in the semi-static scheduling manner.

The operation that the MS transmits the service with the different requirement(s) according to the first control signaling in S830 may include that:

the MS transmits the first service and the second service by means of the second resource allocation parameter set.

Optionally, as another embodiment, the second resource allocation parameter set may be determined by the network equipment according to the requirement(s) of the second service which is newly added, the first control signaling may be configured to indicate the MS to transmit the service with the different requirement(s) by means of the second resource allocation parameter set and the first resource allocation parameter set in the semi-static scheduling manner.

The operation that the MS transmits the service with the different requirement(s) according to the first control signaling in S830 may include that:

the MS transmits the first service by means of the first resource allocation parameter set; and the MS transmits the second service by means of the second resource allocation parameter set.

According to the embodiment of the disclosure, the MS transmits the present service by means of the first resource allocation parameter set in the semi-static scheduling manner, and when the requirement(s) of the service is changed, the network equipment indicates the MS through control signaling to transmit the service with the different requirement(s) by means of the second resource allocation parameter set instead of the first resource allocation parameter set or transmit the service with the different requirement(s) by both the second resource allocation parameter set and the first resource allocation parameter set, so that semi-static scheduling reconfiguration may be completed through relatively less control signaling, and a signaling overhead may be reduced.

Figure 9:
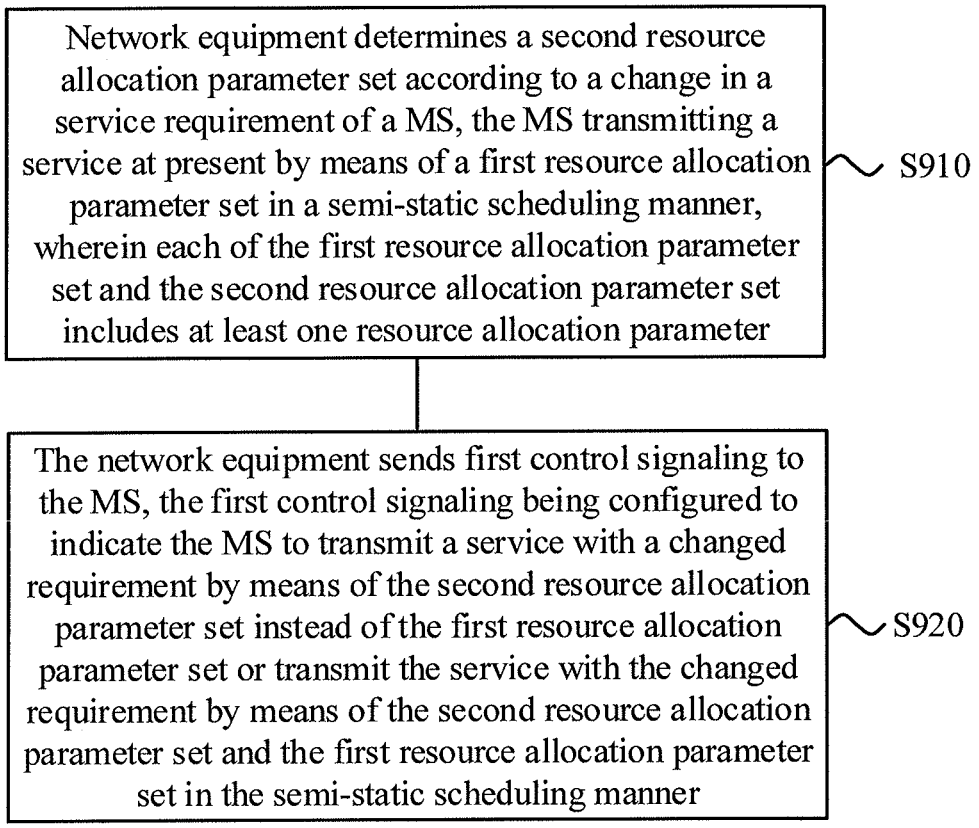
FIG. 9 is a schematic flowchart of a method for transmitting a service according to yet still another embodiment of the disclosure.

A method 900 of the embodiments of the disclosure for transmitting a service will be described below in detail from the angle of network equipment in combination with FIG. 9. The method 900 includes the following steps.

In S910, network equipment determines a second resource allocation parameter set according to a change in a service requirement of an MS, the MS transmitting a service at present by means of a first resource allocation parameter set in a semi-static scheduling manner, wherein each of the first resource allocation parameter set and the second resource allocation parameter set includes at least one resource allocation parameter.

In S920, the network equipment sends first control signaling to the MS, the first control signaling being configured to indicate the MS to transmit a service with different requirement(s) by means of the second resource allocation parameter set instead of the first resource allocation parameter set or transmit the service with the different requirement(s) by means of the second resource allocation parameter set and the first resource allocation parameter set in the semi-static scheduling manner.

It should be understood that, before the operation that the network equipment determines the second resource allocation parameter set according to the change in the service requirement of the MS in S910, the method 900 may further include that:

the network equipment sends third control signaling to the MS, the third control signaling being configured to indicate the MS to transmit the service by means of the first resource allocation parameter set in the semi-static scheduling manner.

Optionally, as an embodiment, the operation that the network equipment determines the second resource allocation parameter set according to the change in the service requirement of the MS in S920 may include that: the network equipment determines the second resource allocation parameter set configured to transmit a first service with different requirement(s) according to a change in requirement(s) of the first service which is transmitted at present, the first control signaling being configured to indicate the MS to transmit the first service with the different requirement(s) by means of the second resource allocation parameter set instead of the first resource allocation parameter set in the semi-static scheduling manner.

Optionally, as another embodiment, the operation that the network equipment determines the second resource allocation parameter set according to the change in the service requirement of the MS in S920 may include that: the network equipment determines the second resource allocation parameter set configured to transmit the first service and a second service according to requirement(s) of the second service which is newly added and the requirement(s) of the first service which is transmitted at present, the first control signaling being configured to indicate the MS to transmit the first service and the second service by means of the second resource allocation parameter set instead of the first resource allocation parameter set in the semi-static scheduling manner.

Optionally, as another embodiment, the operation that the network equipment determines the second resource allocation parameter set according to the change in the service requirement of the MS in S920 may include that: the network equipment determines the second resource allocation parameter set configured to transmit the second service according to the requirement(s) of the second service which is newly added; and the network equipment determines to transmit the first service still by means of the first resource allocation parameter set, the first control signaling being configured to indicate the MS to transmit the first service by means of the first resource allocation parameter set and transmit the second service by means of the second resource allocation parameter set in the semi-static scheduling manner.

According to the embodiment of the disclosure, the MS transmits the present service by means of the first resource allocation parameter set in the semi-static scheduling manner, and when the requirement(s) of the service is changed, the network equipment indicates the MS through control signaling to transmit the service with the different requirement(s) by means of the second resource allocation parameter set instead of the first resource allocation parameter set or transmit the service with the different requirement(s) by both the second resource allocation parameter set and the first resource allocation parameter set, so that semi-static scheduling reconfiguration may be completed through relatively less control signaling, and a signaling overhead may be reduced.

The method of the embodiments of the disclosure for transmitting a service is described above in detail, and an MS and network equipment of the embodiments of the disclosure will be described below in detail.

Figure 10:
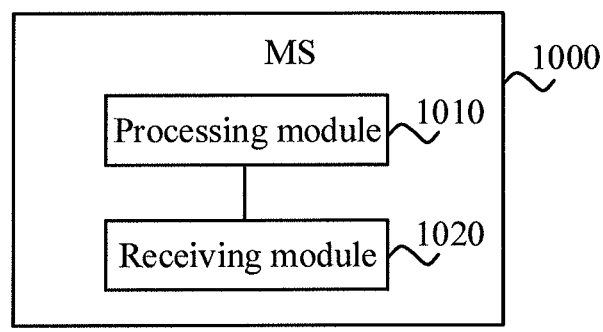
FIG. 10 is a schematic block diagram of an MS according to an embodiment of the disclosure.

FIG. 10 is a schematic block diagram of an MS 1000 according to an embodiment of the disclosure. As shown in FIG. 10, the MS 1000 includes:

a processing module 1010, configured to transmit a present service by means of a first resource allocation parameter set in a semi-static scheduling manner; and a receiving module 1020, configured to receive first control signaling sent by network equipment, the first control signaling being configured to indicate the MS to transmit a service with different requirement(s) by means of a second resource allocation parameter set instead of the first resource allocation parameter set or transmit the service with the different requirement(s) by means of the second resource allocation parameter set and the first resource allocation parameter set in the semi-static scheduling manner.

The processing module 1010 is further configured to transmit the service with the different requirement(s) according to the first control signaling, wherein each of the first resource allocation parameter set and the second resource allocation parameter set includes at least one resource allocation parameter.

Optionally, as an embodiment, the second resource allocation parameter set is determined by the network equipment according to a change in requirement(s) of a first service which is transmitted at present, the first control signaling is configured to indicate the MS to transmit the service with the different requirement(s) by means of the second resource allocation parameter set instead of the first resource allocation parameter set in the semi-static scheduling manner, and the processing module 1010 is specifically configured to transmit the first service with different requirement(s) by means of the second resource allocation parameter set instead of the first resource allocation parameter set.

Optionally, as another embodiment, the second resource allocation parameter set is determined by the network equipment according to requirement(s) of a second service which is newly added and the requirement(s) of the first service which is transmitted at present, the first control signaling is configured to indicate the MS to transmit the service with the different requirement(s) by means of the second resource allocation parameter set instead of the first resource allocation parameter set in the semi-static scheduling manner, and the processing module 1010 is specifically configured to transmit the first service and the second service by means of the second resource allocation parameter set.

Optionally, as another embodiment, the second resource allocation parameter set is determined by the network equipment according to the requirement(s) of the second service which is newly added, the first control signaling is configured to indicate the MS to transmit the service with the different requirement(s) by means of the second resource allocation parameter set and the first resource allocation parameter set in the semi-static scheduling manner, and the processing module 1010 is specifically configured to transmit the first service by means of the first resource allocation parameter set; and transmit the second service by means of the second resource allocation parameter set.

In the embodiment of the disclosure, the first control signaling includes a first information field and a second information field, the first information field is configured to include information of the first resource allocation parameter set, and the second information field is configured to include information of the second resource allocation parameter set.

Optionally, as an embodiment, resource allocation parameters in the resource allocation parameter sets include at least one of: a transmission period, sizes of transmission blocks, a number of the transmission blocks, locations of the transmission blocks, an uplink power control parameter, an MCS or a number of HARQ processes.

Optionally, as an embodiment, the receiving module 1010 is further configured to, before receiving the first control signaling sent by the network equipment, receive second control signaling sent by the network equipment, the second control signaling being configured to indicate N resource allocation parameter sets and the N resource allocation parameter sets including the first resource allocation parameter set and the second resource allocation parameter set.

Optionally, as an embodiment, the second control signaling is RRC signaling.

Optionally, as an embodiment, the network equipment and the MS store a one-to-one correspondence between the N resource allocation parameter sets and N indexes, and the second control signaling includes the N indexes.

Optionally, as an embodiment, the first control signaling indicates the second resource allocation parameter set through an index. In addition, the third control signaling may indicate the first resource allocation parameter set through an index.

Optionally, as an embodiment, the index includes a number or an RNTI.

Optionally, as an embodiment, the first control signaling is a PDCCH. In addition, the third control signaling may be a PDCCH.

Figure 11:
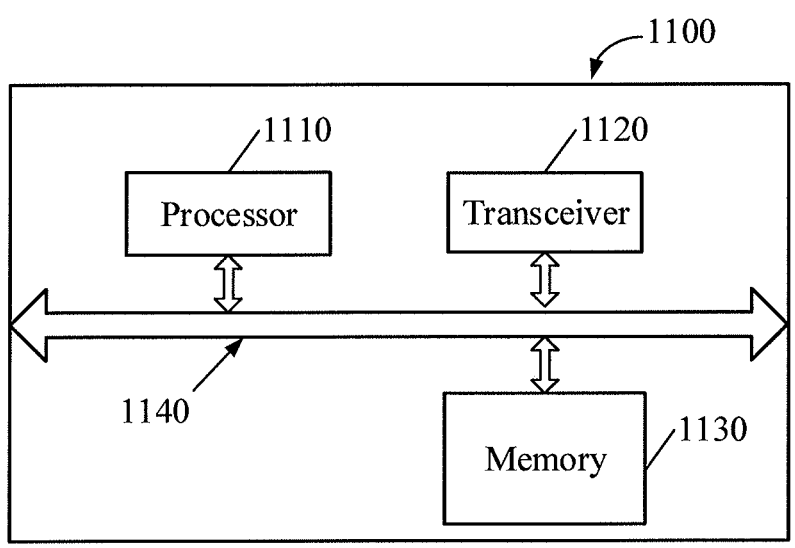
FIG. 11 is a schematic block diagram of an MS according to another embodiment of the disclosure.

It is noted that, in the embodiment of the disclosure, the receiving module 1020 may be implemented by a transceiver and the processing module 1010 may be implemented by a processor and the transceiver. As shown in FIG. 11, an MS 1100 may include a processor 1110, a transceiver 1120 and a memory 1130, wherein the memory 1130 may be configured to store a code executed by the processor 1110 or the like.

Each component in the MS 1100 is coupled together through a bus system 1140, wherein the bus system 1140 includes a data bus, and further includes a power bus, a control bus and a state signal bus.

The MS 1000 shown in FIG. 10 or the MS 1100 shown in FIG. 11 may implement each process implemented in the embodiments shown in FIG. 1 to FIG. 7, which will not be elaborated herein to avoid repetition.

It is noted that the method embodiments of the disclosure may be applied to a processor or implemented by the processor. The processor may be an integrated circuit chip with a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories, wherein the nonvolatile memory may be a ROM, a PROM, an EPROM, an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is noted that the memory of a system and method described in the disclosure is intended to include, but not limited to, memories of these and any other proper types.

Figure 12:
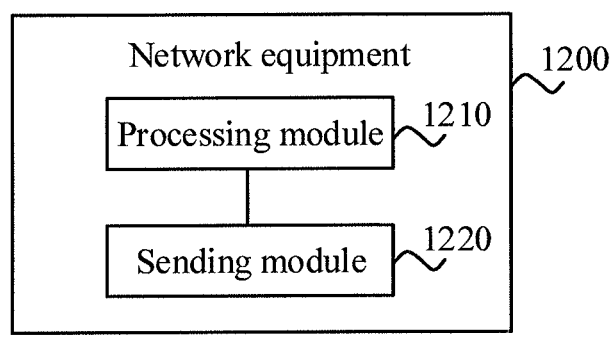
FIG. 12 is a schematic block diagram of network equipment according to an embodiment of the disclosure.

FIG. 12 is a schematic block diagram of network equipment 1200 according to an embodiment of the disclosure. As shown in FIG. 12, the network equipment 1200 includes:

a processing module 1210, configured to determine a second resource allocation parameter set according to a change in a service requirement of an MS, the MS transmitting a service at present by means of a first resource allocation parameter set in a semi-static scheduling manner, wherein each of the first resource allocation parameter set and the second resource allocation parameter set includes at least one resource allocation parameter; and a sending module 1220, configured to send first control signaling to the MS, the first control signaling being configured to indicate the MS to transmit a service with different requirement(s) by means of the second resource allocation parameter set instead of the first resource allocation parameter set or transmit the service with the different requirement(s) by means of the second resource allocation parameter set and the first resource allocation parameter set in the semi-static scheduling manner.

Optionally, as an embodiment, the processing module 1210 is specifically configured to determine the second resource allocation parameter set configured to transmit a first service with different requirement(s) according to a change in requirement(s) of the first service which is transmitted at present, the first control signaling being configured to indicate the MS to transmit the first service with the different requirement(s) by means of the second resource allocation parameter set instead of the first resource allocation parameter set in the semi-static scheduling manner.

Optionally, as another embodiment, the processing module 1210 is specifically configured to determine the second resource allocation parameter set configured to transmit the first service and a second service according to requirement(s) of the second service which is newly added and the requirement(s) of the first service which is transmitted at present, the first control signaling being configured to indicate the MS to transmit the first service and the second service by means of the second resource allocation parameter set instead of the first resource allocation parameter set in the semi-static scheduling manner.

Optionally, as another embodiment, the processing module 1210 is specifically configured to determine the second resource allocation parameter set configured to transmit the second service according to the requirement(s) of the second service which is newly added; and determine to transmit the first service still by means of the first resource allocation parameter set, the first control signaling being configured to indicate the MS to transmit the first service by means of the first resource allocation parameter set and transmit the second service by means of the second resource allocation parameter set in the semi-static scheduling manner.

In the embodiment of the disclosure, the first control signaling includes a first information field and a second information field, the first information field is configured to include information of the first resource allocation parameter set, and the second information field is configured to include information of the second resource allocation parameter set.

Optionally, as an embodiment, resource allocation parameters in the resource allocation parameter sets include at least one of: a transmission period, sizes of transmission blocks, a number of the transmission blocks, locations of the transmission blocks, an uplink power control parameter, an MCS or a number of HARQ processes.

Optionally, as an embodiment, the sending module 1220 is further configured to, before the processing module 1210 determines the second resource allocation parameter set according to the change in the service requirement of the MS, send second control signaling to the MS, the second control signaling being configured to indicate N resource allocation parameter sets and the N resource allocation parameter sets including the first resource allocation parameter set and the second resource allocation parameter set.

Optionally, as an embodiment, the second control signaling is RRC signaling.

Optionally, as an embodiment, the network equipment and the MS store a one-to-one correspondence between the N resource allocation parameter sets and N indexes, and the second control signaling includes the N indexes.

Optionally, as an embodiment, the first control signaling indicates the second resource allocation parameter set through an index.

Optionally, as an embodiment, the index includes a number or an RNTI.

Optionally, as an embodiment, the first control signaling is a PDCCH.

Figure 13:
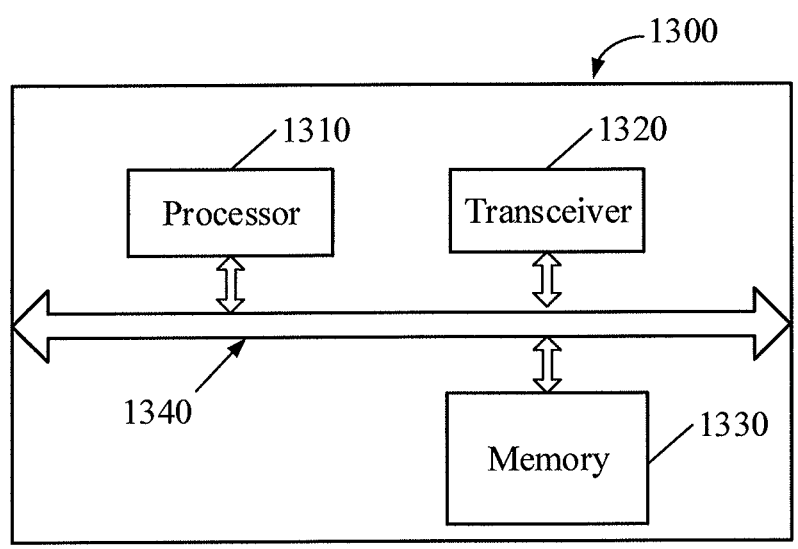
FIG. 13 is a schematic block diagram of network equipment according to another embodiment of the disclosure.

It is noted that, in the embodiment of the disclosure, the sending module 1220 may be implemented by a transceiver and the processing module 1210 may be implemented by a processor and the transceiver. As shown in FIG. 13, network equipment 1300 may include a processor 1310, a transceiver 1320 and a memory 1330, wherein the memory 1330 may be configured to store a code executed by the processor 1310 or the like.

Each component in the network equipment 1300 is coupled together through a bus system 1340, wherein the bus system 1340 includes a data bus, and further includes a power bus, a control bus and a state signal bus.

The network equipment 1200 shown in FIG. 12 or the network equipment 1300 shown in FIG. 13 may implement each process implemented in the embodiments shown in FIG. 1 to FIG. 7, which will not be elaborated herein to avoid repetition.

It should be understood that, in each embodiment of the disclosure, a magnitude of a sequence number of each process does not mean an execution sequence and the execution sequence of each process should be determined by its function and an internal logic and should not form any limit to an implementation process of the embodiments of the disclosure.

Those of ordinary skilled in the art may realize that each unit and algorithm step of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by means of different methods, but such realization shall fall within the scope of the disclosure.

Those skilled in the art may clearly learn about that specific working processes of the systems, devices and units described above may refer to the corresponding processes in the method embodiments and will not be elaborated herein for convenient and brief description.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments of the disclosure according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmitting a service, comprising:
transmitting, by a Mobile Station (MS), a service by using a first resource allocation parameter set in a semi-static scheduling manner;
receiving, by the MS, first control signaling sent by network equipment, the first control signaling being configured to indicate the MS to transmit the service with different requirement(s) by using a second resource allocation parameter set and the first resource allocation parameter set in the semi-static scheduling manner; and
transmitting, by the MS, the service with different requirement(s) according to the first control signaling, wherein each of the first resource allocation parameter set and the second resource allocation parameter set comprises at least one resource allocation parameter.

2. The method according to claim 1, wherein the second resource allocation parameter set is determined by the network equipment according to the requirement(s) of the second service which is newly added, the first control signaling is configured to indicate the MS to transmit the service with different requirement(s) by using the second resource allocation parameter set and the first resource allocation parameter set in semi-static scheduling manner, and
wherein the transmitting, by the MS, the service with different requirement(s) according to the first control signaling comprises:
transmitting, by the MS, the first service by using the first resource allocation parameter set; and
transmitting, by the MS, the second service by using the second resource allocation parameter set.

3. The method according to claim 2, wherein the first control signaling comprises a first information field and a second information field, the first information field is configured to include information of the first resource allocation parameter set, and the second information field is configured to include information of the second resource allocation parameter set.

4. The method according to claim 1, wherein the at least one resource allocation parameter comprises at least one of:
a transmission period, sizes of transmission blocks, a number of the transmission blocks, locations of the transmission blocks, an uplink power control parameter, a Modulation and Coding Scheme (MCS) or a number of Hybrid Automatic Repeat reQuest (HARM) processes.

5. The method according to claim 1, before the receiving, by the MS, the first control signaling sent by the network equipment, further comprising:
receiving, by the MS, second control signaling sent by the network equipment, the second control signaling being configured to indicate N resource allocation parameter sets and the N resource allocation parameter sets comprising the first resource allocation parameter set and the second resource allocation parameter set.

6. The method according to claim 1, wherein the first control signaling indicates the second resource allocation parameter set through an index, wherein the index comprises a number or a Radio Network Temporary Identity (RNTI).

7. A method for transmitting a service, comprising:
determining, by network equipment, a second resource allocation parameter set according to a change in a service requirement of a mobile station (MS), wherein the MS transmits a service at present by using a first resource allocation parameter set in a semi-static scheduling manner, and each of the first resource allocation parameter set and the second resource allocation parameter set comprises at least one resource allocation parameter; and
sending, by the network equipment, first control signaling to the MS, the first control signaling being configured to indicate the MS to transmit the service with the different requirement(s) by using the second resource allocation parameter set and the first resource allocation parameter set in the semi-static scheduling manner.

8. The method according to claim 7, wherein the determining, by the network equipment, the second resource allocation parameter set according to the change in the service requirement of the MS comprises: determining, by the network equipment, the second resource allocation parameter set configured to transmit the second service according to the requirement(s) of the second service which is newly added; and determining, by the network equipment, to transmit the first service still by using the first resource allocation parameter set,
the first control signaling being configured to indicate the MS to transmit the first service by using the first resource allocation parameter set and transmit the second service by using the second resource allocation parameter set in the semi-static scheduling manner,
wherein the first control signaling comprises a first information field and a second information field, the first information field is configured to include information of the first resource allocation parameter set, and the second information field is configured to include information of the second resource allocation parameter set.

9. The method according to claim 7, before the determining, by the network equipment, the second resource allocation parameter set according to the change in the service requirement of the MS, further comprising:
sending, by the network equipment, second control signaling to the MS, the second control signaling being configured to indicate N resource allocation parameter sets and the N resource allocation parameter sets comprising the first resource allocation parameter set and the second resource allocation parameter set.

10. The method according to claim 7, wherein the first control signaling indicates the second resource allocation parameter set through an index, wherein the index comprises a number or a Radio Network Temporary Identity (RNTI).

11. A mobile station (MS), comprising:
a processor, configured to control a transceiver to transmit a service by using a first resource allocation parameter set in a semi-static scheduling manner; and
the transceiver, configured to receive first control signaling sent by network equipment, the first control signaling being configured to indicate the MS to transmit the service with the different requirement(s) by using a second resource allocation parameter set and the first resource allocation parameter set in the semi-static scheduling manner,
the processor being further configured to control the transceiver to transmit the service with the different requirement(s) according to the first control signaling, wherein each of the first resource allocation parameter set and the second resource allocation parameter set comprises at least one resource allocation parameter.

12. The MS according to claim 11, wherein the second resource allocation parameter set is determined by the network equipment according to the requirement(s) of the second service which is newly added, the first control signaling is configured to indicate the MS to transmit the service with the different requirement(s) by using the second resource allocation parameter set and the first resource allocation parameter set in the semi-static scheduling manner, and
the processor is specifically configured to control the transceiver to:
transmit the first service by using the first resource allocation parameter set; and
transmit the second service by using the second resource allocation parameter set,
wherein the first control signaling comprises a first information field and a second information field, the first information field is configured to include information of the first resource allocation parameter set, and the second information field is configured to include information of the second resource allocation parameter set.

13. The MS according to claim 11, wherein the transceiver is further configured to:
before receiving the first control signaling sent by the network equipment, receive second control signaling sent by the network equipment, the second control signaling being configured to indicate N resource allocation parameter sets and the N resource allocation parameter sets comprising the first resource allocation parameter set and the second resource allocation parameter set.

14. The MS according to claim 11, wherein the first control signaling indicates the second resource allocation parameter set through an index, wherein the index comprises a number or a Radio Network Temporary Identity (RNTI).

* * * * *